US012724617B2

(12) United States Patent
Machado et al.

(10) Patent No.: US 12,724,617 B2
(45) Date of Patent: Sep. 1, 2026

(54) SYSTEM AND METHOD FOR SELECTIVELY REVERTING BIOS SETTINGS

(71) Applicant: Lenovo (Singapore) Pte. Ltd., Singapore (SG)

(72) Inventors: Rafael Rodrigues Machado, Sorocaba (BR); Nathan Peterson, Oxford, NC (US); Scott Wentao Li, Cary, NC (US); Igor Stolbikov, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 30 days.

(21) Appl. No.: 18/340,221

(22) Filed: Jun. 23, 2023

(65) Prior Publication Data

US 2024/0427610 A1 Dec. 26, 2024

(51) Int. Cl.
*G06F 9/4401* (2018.01)
*G06F 9/445* (2018.01)

(52) U.S. Cl.
CPC ........ *G06F 9/4403* (2013.01); *G06F 9/44505* (2013.01)

(58) Field of Classification Search
CPC ........................... G06F 9/4403; G06F 9/44505
See application file for complete search history.

(56) References Cited

U.S. PATENT DOCUMENTS

| | | | | |
|---|---|---|---|---|
| 11,397,593 | B1 * | 7/2022 | Lin | G06F 9/44505 |
| 2004/0172498 | A1 * | 9/2004 | Taylor | G06F 12/0623 711/E12.081 |
| 2006/0020844 | A1 * | 1/2006 | Gibbons | G06F 11/142 714/E11.134 |
| 2009/0292910 | A1 * | 11/2009 | Yang | G06F 9/453 713/2 |
| 2010/0082957 | A1 * | 4/2010 | Iwata | G06F 9/4403 713/1 |
| 2016/0306688 | A1 * | 10/2016 | Boyapalle | G06F 11/0793 |
| 2017/0123927 | A1 * | 5/2017 | Su | G06F 9/4403 |
| 2020/0349009 | A1 * | 11/2020 | Samuel | G06F 11/1469 |
| 2021/0042047 | A1 * | 2/2021 | Shibayama | G06F 3/0632 |
| 2021/0096880 | A1 * | 4/2021 | Bhuiyan | G06F 9/44505 |
| 2021/0240489 | A1 * | 8/2021 | Xie | G06F 21/572 |
| 2021/0397459 | A1 * | 12/2021 | Tsao | G06F 9/44505 |
| 2022/0283918 | A1 * | 9/2022 | Chaiken | G06F 9/4401 |
| 2023/0229453 | A1 * | 7/2023 | Chen | G06F 9/4406 713/2 |
| 2024/0289135 | A1 * | 8/2024 | Chen | G06F 1/26 |

* cited by examiner

*Primary Examiner* — Nimesh G Patel
(74) *Attorney, Agent, or Firm* — Schwegman Lundberg & Woessner, P.A.

(57) ABSTRACT

A computer implemented method includes receiving a change to a first BIOS (basic input/output system) setting on a computer, maintaining a record of the first BIOS setting prior to the change, rebooting the computer to effect the change the first BIOS setting, detecting that an operating system did not successfully load, generating a user interface enabling a user to select to revert to the first BIOS setting, and rebooting the computer in response to selection to revert to the first BIOS setting.

15 Claims, 4 Drawing Sheets

SYSTEM AND METHOD FOR SELECTIVELY REVERTING BIOS SETTINGS

BACKGROUND

Some computers utilize software referred to as a basic input/output system (BIOS) to initialize hardware components when the computer is turned on. BIOS can also serve as an interface between the hardware and operating system software. BIOS may have multiple different settings or variables that a user can modify.

When a user decides to perform some change of the BIOS settings, there is a possibility that one or more of the changes will result in the operating system may stop working. The operating system may not load, meaning that it is not operating. Since applications, such as browsers, word processors, spread sheets, email programs and others need the operating system running, the BIOS settings need to be fixed before the user can continue using the computer. Most users are not familiar with how to fix bios settings, once the operating system fails to load properly.

One way to attempt to help the user fix the bios settings involves adding some text description in BIOS settings details. Most users do not normally read such details, or don't know how to interpret such details even if they find the details.

SUMMARY

A computer implemented method includes receiving a change to a first BIOS (basic input/output system) setting on a computer, maintaining a record of the first BIOS setting prior to the change, rebooting the computer to effect the change the first BIOS setting, detecting that an operating system did not successfully load, generating a user interface enabling a user to select to revert to the first BIOS setting, and rebooting the computer in response to selection to revert to the first BIOS setting.

DETAILED DESCRIPTION

Figure 1:
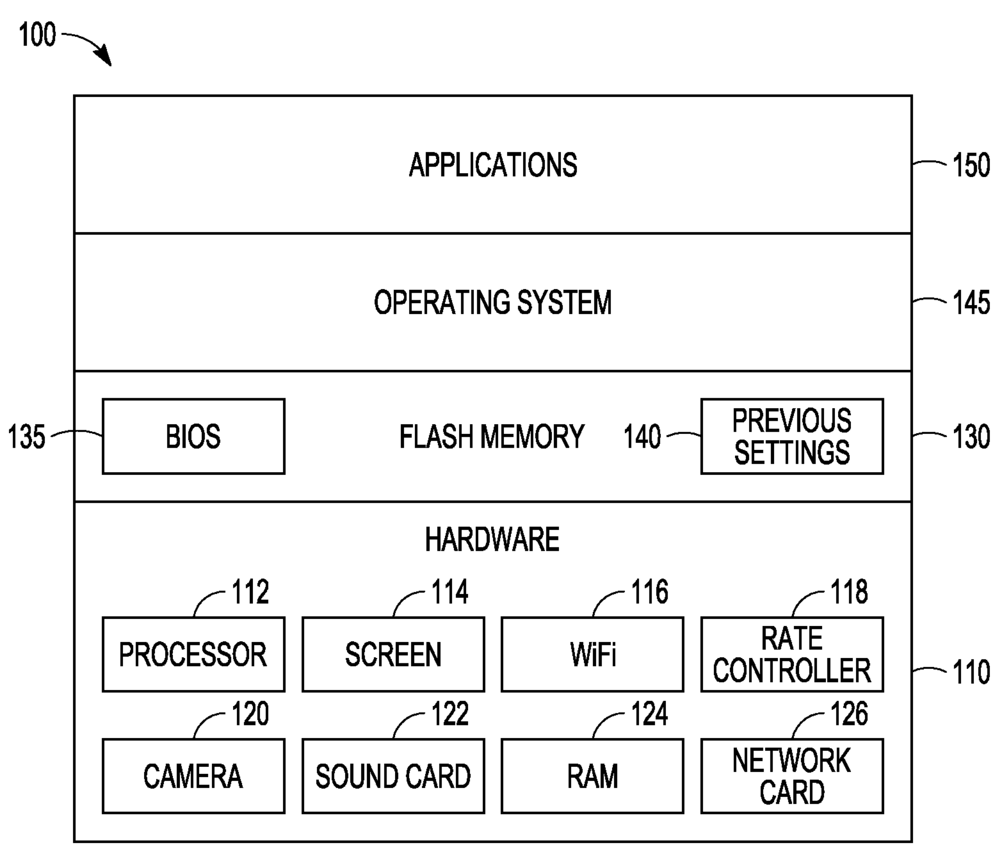
FIG. 1 is a block architecture representation of a computer system for selectively reverting to prior BIOS settings according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

When a user decides to perform some change of the BIOS settings, there is a possibility that one or more of the changes will result in the operating system may stop working. The operating system may not load, meaning that it is not operating. Since applications, such as browsers, word processors, spread sheets, email programs and others need the operating system running, the BIOS settings need to be fixed before the user can continue using the computer. Most users are not familiar with how to fix bios settings, once the operating system fails to load properly.

An improved method of reverting BIOS settings on a computer includes keeping a list of previous settings in response to BIOS settings being modified. For modified settings to take effect, the computer is rebooted, such as by powering off the computer and powering it back on. BIOS is the first software to load, and initiates the hardware. Once the hardware is initiated, the computer will then load the operating system. If the operating system loads successfully, all is well, and applications may continue to load and the computer is usable in the intended manner.

In the event that the operating system fails to load, or does not load properly, the BIOS may detect that the operating system is not operating properly and the BIOS may then offer an option to revert the modified settings back to the previous settings. If this option is selected, the computer may be rebooted, and BIOS will reload with the previous settings, and the operating system and applications may then successfully load.

In one example, BIOS may utilize an event log that tracks times that the computer is turned on, which is referred to as a boot time. If the event log indicates that the computer was recently booted, but the operating system did not load, BIOS can detect that the operating system did not boot or otherwise failed to load, and can display the option to revert the settings.

In further examples, UEFI (unified extensible firmware interface) variables that are accessible by BIOS and the operating system may be used as an indicator of successful loading of the operating system. The operating system may set a selected UEFI variable, which may be noted by the BIOS. If BIOS, a selected time after BIOS boots, notes that the UEFI variable has not been set or changed by the operating system, the reboot option may be displayed. In a further example, the BIOS, or operating system may generate a display that asks the user for confirmation that everything booted successfully. If not, the reversion option may be displayed.

In one example, Unified Extensible Firmware Interface (UEFI) is a specification for a software program that connects a computer's firmware to its operating system (OS). UEFI is expected to eventually replace BIOS but is compatible with it. The use of the term BIOS is meant to encompass any software, such as UEFI, that initiated hardware components.

UEFI functions via special firmware installed on a computer's hardware, usually referred to as a system board. Like BIOS, UEFI is installed at the time of manufacturing and is the first program that runs when booting a computer. It checks to see which hardware components are attached, wakes up the components and hands them over to the operating system.

UEFI variables provide a way to store data, in particular non-volatile data. Some UEFI variables are shared between platform firmware and operating systems. Variable namespaces are identified by GUIDs, and variables are key/value pairs. Example variables include InitialAttempOrder, certdb, SecureBootEnable, and SecureBoot.

FIG. 1 is a block architecture representation of a computer system 100 for selectively reverting to prior BIOS settings. Computer system 100 may be a personal computer, laptop, tablet, or other device. System 100 includes hardware 110, which may have multiple hardware components. Such hardware components may include but are not limited to a processor 112, display screen 114, WiFi card 116, rate controller 118, camera 120, sound card 122, random access memory (RAM) 124, and network card 126 as well as peripheral component interconnect (PCI) devices, such as RAID (redundant array of independent disk drives) devices.

Hardware 110 may also include a nonvolatile memory, such as flash memory 130 on which code, such as BIOS 135 may be stored and used to initiate the hardware components on powering on the hardware 110. Settings for BIOS 135 may also be stored on the flash memory 130, and a list of previous settings 140 may also be stored on the flash memory to be used for reverting back to the previous settings 140 from settings that were changed by a user of the system 100.

System 100 may also include an operating system 145 and applications 150, which may be successively loaded following loading of BIOS 135 and initiation of the hardware components.

Figure 2:
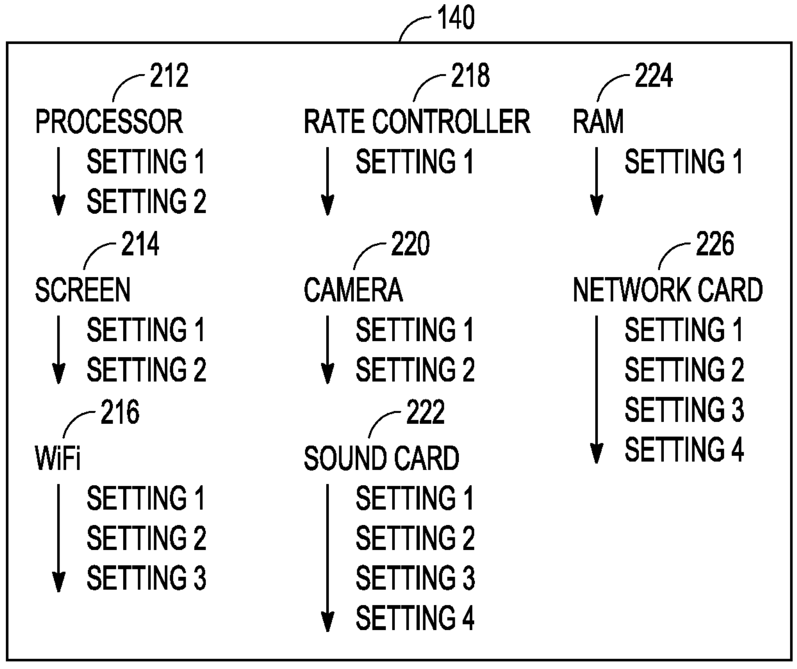
FIG. 2 is an example data structure for prior BIOS settings according to an example embodiment.

FIG. 2 is an example data structure for the list of previous settings 140. In one example, the list of previous settings 140 may be a linked list of settings stored in a partition of a BIOS managed file system, with logically separate settings for each of the hardware components. The list is separate from the actual current settings, which ensures the previous settings will be available for reversion. The list includes a name corresponding to each hardware component as indicated at processor 212, screen 214, WiFi 216, rate controller 218, camera 220, sound card 222, RAM 224, and network card 226. Each components also has one or more settings, labeled SETTING 1, SETTING 2, SETTING 3, and SETTING 4.

Each of the components may have an associated BIOS module, such as a driver, which the corresponding settings are used to modify the behavior of the driver. The modification of the behavior of one of the modules may result in the inability of the operating system 145 to successfully load.

Figure 3:
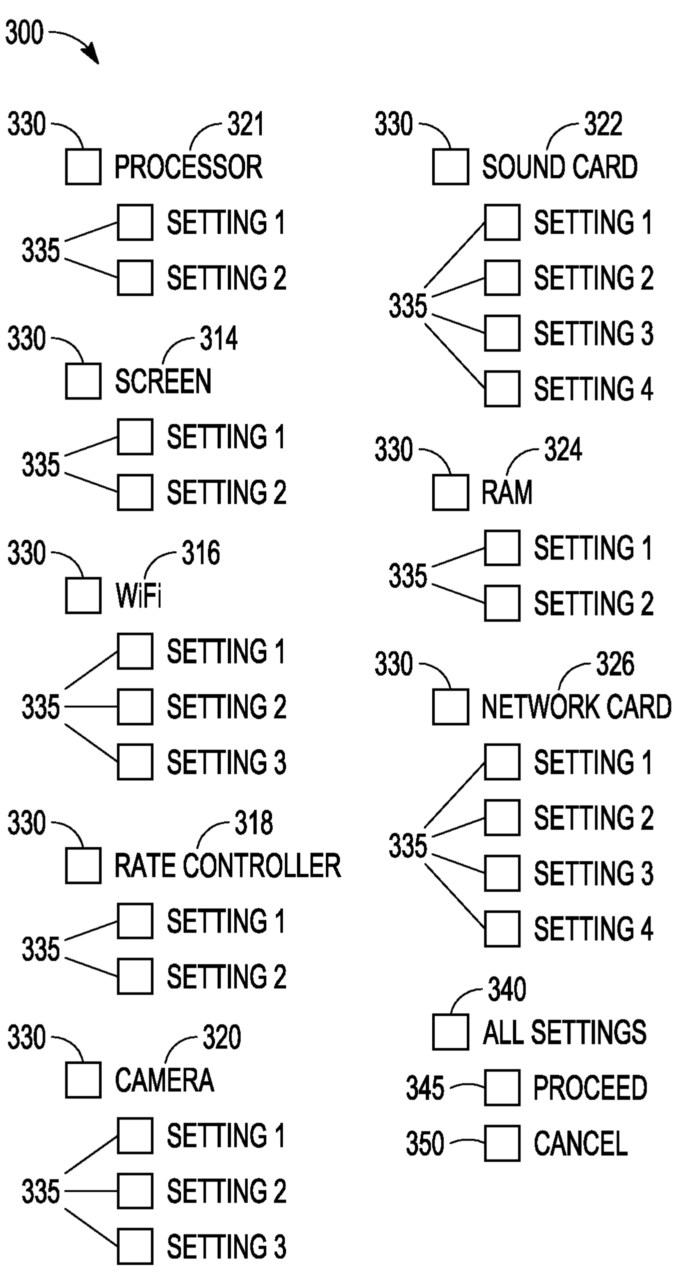
FIG. 3 is a representation of an example BIOS setting reversion interface according to an example embodiment.

FIG. 3 is a representation of an example BIOS setting reversion interface 300. In one example, each module is listed. Individual settings for each module may optionally be listed. The user interface list includes processor 312, screen 314, WiFi 316, rate controller 318, camera 320, sound card 322, RAM 324, and network card 326. Each components also has one or more settings, labeled SETTING 1, SETTING 2, SETTING 3, and SETTING 4.

Since changes to the variables of any one of the BIOS modules may result in the inability of the operating system 145 to successfully load, the user interface 300 provides options, such as checkboxes 330 to revert the variables of any one or more of the modules, or optionally checkboxes 335 for any one or more of the all the variables associated with one or more of the modules, or all the variables of all the modules as indicated by checkbox 340. In further examples, other visual indications of selections may be used, such as highlighting or bolding labels. A proceed box 345 may also be provided as well as a cancel box 350.

In case some BIOS setting was changed, at the next boot the operating system 145 confirms to the BIOS 135 that the boot process was performed until the OS was able to be successfully loaded. If the BIOS never receives this confirmation, a reboot is performed, and the user interface 300 may be presented as a popup asking if the user wants to roll back the BIOS settings changes to revert to the previous settings under which the operating system successfully loaded.

In one example each individual module or driver may separately monitor whether or not the operating system loaded by monitoring separate variables that were not modified by the operating system, indicating the operating system did not load, or by receiving separate confirmations from the operating system if it successfully loaded. One or more modules or drivers that detected the operating system did not successfully load may generate user interface 300 with the settings for those modules highlighted or otherwise indicated as causing the operating system to not load, simplifying the task of determining which settings were at fault and allowing reversion of just those settings if desired.

Figure 4:
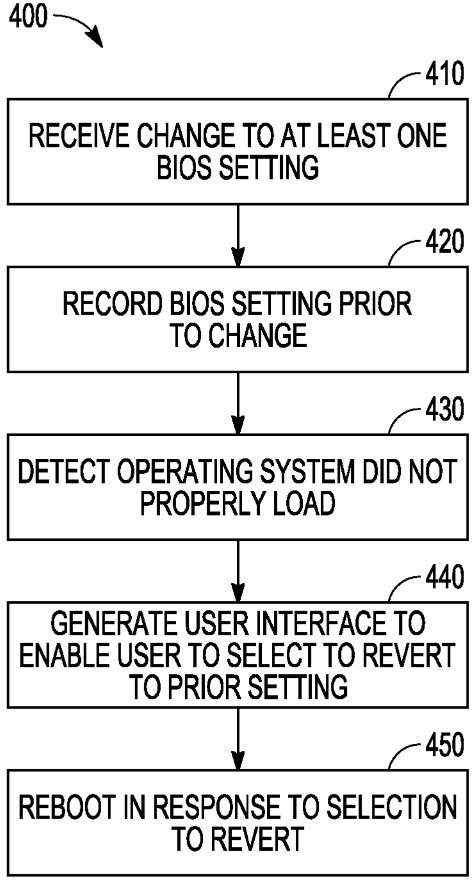
FIG. 4 is a flowchart illustrating a computer implemented method 400 of managing BIOS settings to selectively revert to prior settings according to an example embodiment.

FIG. 4 is a flowchart illustrating a computer implemented method 400 of managing BIOS settings to selectively revert to prior settings. Method 400 begins at operation 410 by receiving a change to a first BIOS (basic input/output system) setting on a computer. In one example, the change to the first BIOS setting comprises changes to multiple BIOS settings. The record may be a linked list of the multiple BIOS settings that may be stored in a partition of non-volatile memory managed by the BIOS.

A record of the first BIOS setting prior to the change is maintained at operation 420. The computer is rebooted at operation 430 to effect the change to the first BIOS setting. Operation 430 detects that an operating system did not successfully load. A user interface is generated at operation 440 to enable a user to select to revert to the first BIOS setting. The user interface enables the user to select one or more of the first BIOS settings. The computer is rebooted at operation 450 in response to selection to revert to the first BIOS setting.

In one example, BIOS includes multiple modules, each module corresponding to a hardware component of the computer, and wherein the linked list comprises a set of settings for each hardware component. The user interface may list each module and provides the ability to select settings to revert from one or more of the modules. The user interface may alternatively list each module and provide the ability to select individual settings to revert.

Figure 5:
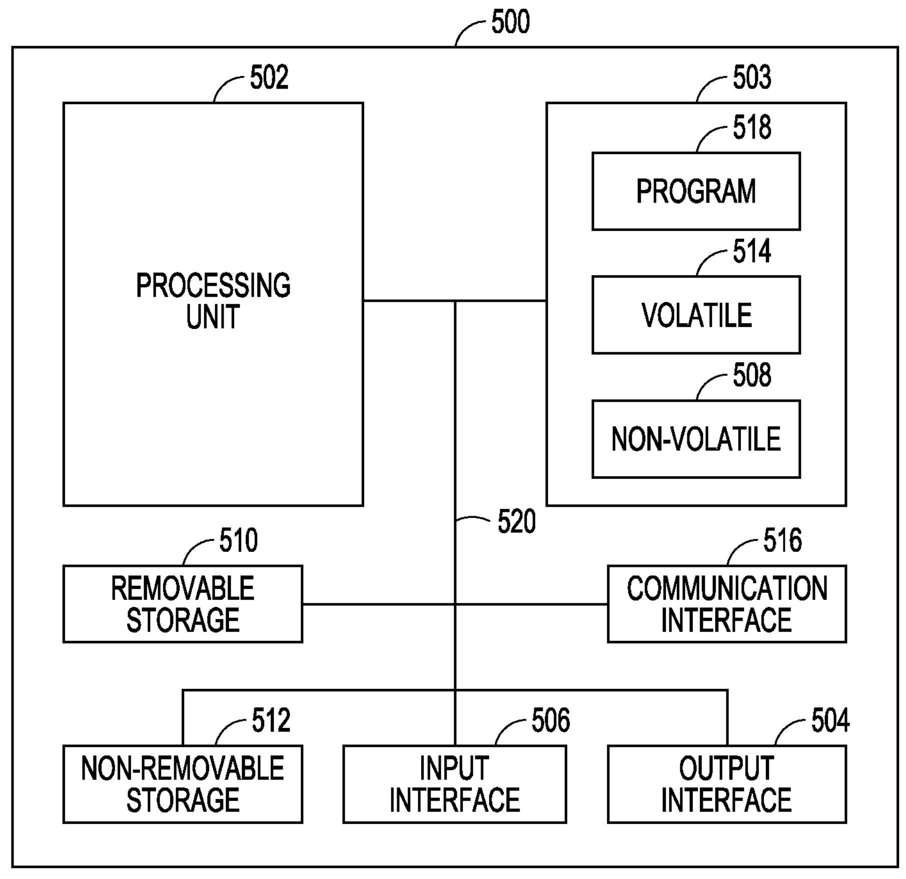
FIG. 5 is a block schematic diagram of a computer system to implement one or more example embodiments.

FIG. 5 is a block schematic diagram of a computer system 500 to manage setting changes in BIOS and selectively revert to previous BIOS and for performing methods and algorithms according to example embodiments. All components need not be used in various embodiments.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 518 along with the workspace manager 522 may be used to cause processing unit 502 to perform one or more methods or algorithms described herein.

Examples

1. A computer implemented method includes receiving a change to a first BIOS (basic input/output system) setting on a computer, maintaining a record of the first BIOS setting prior to the change, rebooting the computer to effect the change the first BIOS setting, detecting that an operating system did not successfully load, generating a user interface enabling a user to select to revert to the first BIOS setting, and rebooting the computer in response to selection to revert to the first BIOS setting.

2. The method of example 1 wherein the change to the first BIOS setting comprises changes to multiple BIOS settings.

3. The method of example 2 wherein the record comprises a linked list of the multiple BIOS settings.

4. The method of example 3 wherein the linked list is stored in a partition of non-volatile memory managed by the BIOS.

5. The method of any of examples 3-4 wherein the user interface enables the user to select one or more of the first BIOS settings.

6. The method of any of examples 3-5 wherein BIOS includes multiple modules, each module corresponding to a hardware component of the computer, and wherein the linked list comprises a set of settings for each hardware component.

7. The method of example 6 wherein the user interface lists each module and provides the ability to select settings to revert from one or more of the modules.

8. The method of any of examples 6-7 wherein the user interface lists each module and provide the ability to select individual settings to revert.

9. A computer implemented method includes receiving changes to BIOS (basic input/output system) settings on a computer, maintaining a record of the BIOS setting prior to the changes, rebooting the computer to effect the changes to the BIOS settings, detecting that an operating system did not successfully load, generating a user interface enabling a user to select to revert to the BIOS settings, and rebooting the computer in response to selection to revert to the first BIOS settings.

10. A machine-readable storage device has instructions for execution by a processor of a machine to cause the processor to perform operations to perform any of the methods of examples 1-9.

11. A device includes a processor and a memory device coupled to the processor and having a program stored thereon for execution by the processor to perform operations to perform any of the methods of examples 1-9.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:

receiving changes to multiple BIOS (basic input/output system) settings on a computer;

maintaining a record of the multiple BIOS settings prior to the change wherein the record comprises a linked list storing individual setting values;

rebooting the computer to effect the changes to the BIOS settings;

detecting that an operating system did not successfully load after the reboot by accessing a UEFI variable shared between the operating system and the BIOS to confirm that the operating system did not set or modify the UEFI variable;

generating a user interface that displays each of the multiple BIOS settings that were changed, wherein the user interface provides individual selection controls for each of the multiple BIOS settings, enabling a user to select a subset of the multiple BIOS settings to revert to their prior values while maintaining remaining BIOS settings at their changed values; and rebooting the computer in response to selection to revert to the subset of the multiple BIOS settings to their prior values while maintaining the remaining BIOS settings at their changed values.

2. The method of claim 1 wherein the linked list is stored in a partition of non-volatile memory managed by the BIOS.

3. The method of claim 1 wherein BIOS includes multiple modules, each module corresponding to a hardware component of the computer, and wherein the linked list comprises a set of settings for each hardware component.

4. The method of claim 3 wherein the user interface lists each module and provides an ability to select settings to revert from one or more of the modules.

5. The method of claim 3, wherein:

each module of the BIOS separately monitors for successful loading of the operating system by monitoring a respective variable associated with that module, detecting that the operating system did not successfully load comprises determining which modules detected the failure based on their respective variables, and generating the user interface comprises displaying a visual indication distinguishing settings associated with modules that detected the failure from settings associated with modules that did not detect the failure.

6. The method of claim 1, wherein maintaining the record comprises:

identifying differences between the multiple BIOS settings prior to the changes and the multiple BIOS settings after the changes;

storing only the identified differences as delta values in the linked list rather than storing complete BIOS configuration data; and wherein rebooting the computer in response to selection comprises applying the delta values to revert the subset of the multiple BIOS settings while maintaining remaining BIOS settings by not applying delta values for the remaining BIOS settings.

7. A machine-readable storage device having instructions for execution by a processor of a machine to cause the processor to perform operations to perform a method, the operations comprising:

receiving changes to multiple BIOS (basic input/output system) settings on a computer;

maintaining a record of the multiple BIOS settings prior to the changes wherein the record comprises a linked list storing individual setting values;

rebooting the computer to effect the changes to the BIOS settings;

detecting that an operating system did not successfully load after the reboot by accessing a UEFI variable shared between the operating system and the BIOS to confirm that the operating system did not set or modify the UEFI variable;

generating a user interface that displays each of the multiple BIOS settings that were changed, wherein the user interface provides individual selection controls for each of the multiple BIOS settings, enabling a user to select a subset of the multiple BIOS settings to revert to their prior values while maintaining remaining BIOS settings at their changed values; and rebooting the computer in response to selection to revert to the subset of the multiple BIOS settings to their prior values while maintaining the remaining BIOS settings at their changed values.

8. The device of claim 7 wherein the linked list is stored in a partition of non-volatile memory managed by the BIOS.

9. The device of claim 7 wherein BIOS includes multiple modules, each module corresponding to a hardware component of the computer, and wherein the linked list comprises a set of settings for each hardware component.

10. The device of claim 9 wherein the user interface lists each module and provides an ability to select settings to revert from one or more of the modules.

11. A device comprising:

a processor; and a non-volatile storage device operably connectable to the processor, the non-volatile storage device storing BIOS code and multiple BIOS settings, wherein the processor executes the BIOS code to perform operations comprising:

receiving changes to multiple BIOS (basic input/output system) settings on a computer;

maintaining a record of the multiple BIOS settings prior to the changes wherein the record comprises a linked list storing individual setting values;

rebooting the computer to effect the changes to the BIOS settings;

detecting that an operating system did not successfully load after the reboot by accessing a UEFI variable shared between the operating system and the BIOS to confirm that the operating system did not set or modify the UEFI variable;

generating a user interface that displays each of the multiple BIOS settings that were changed, wherein the user interface provides individual selection controls for each of the multiple BIOS settings, enabling a user to select a subset of the multiple BIOS settings to revert to their prior values while maintaining remaining BIOS settings at their changed values; and rebooting the computer in response to selection to revert to the subset of the multiple BIOS settings to their prior values while maintaining the remaining BIOS settings at their changed values.

12. The device of claim 11 wherein BIOS includes multiple modules, each module corresponding to a hardware component of the computer, and wherein the linked list comprises a set of settings for each hardware component.

13. The device of claim 12 wherein the user interface lists each module and provides an ability to select settings to revert from one or more of the modules or to select individual settings to revert.

14. The device of claim 11, wherein the non-volatile storage device comprises a first local storage device and a second remote storage device and wherein maintaining the record comprises storing the linked list at the first local storage device and the second remote storage device.

15. The device of claim 11, wherein the BIOS code comprises multiple modules, each module corresponding to a hardware component of the computing system, wherein the linked list comprises a set of settings for each module, and wherein the user interface displays each module with its associated settings organized by module.

* * * * *